(No Model.)
R. R. HARRIS.
AIR PUMP.
No. 575,946.　　　　　　　　　　　Patented Jan. 26, 1897.
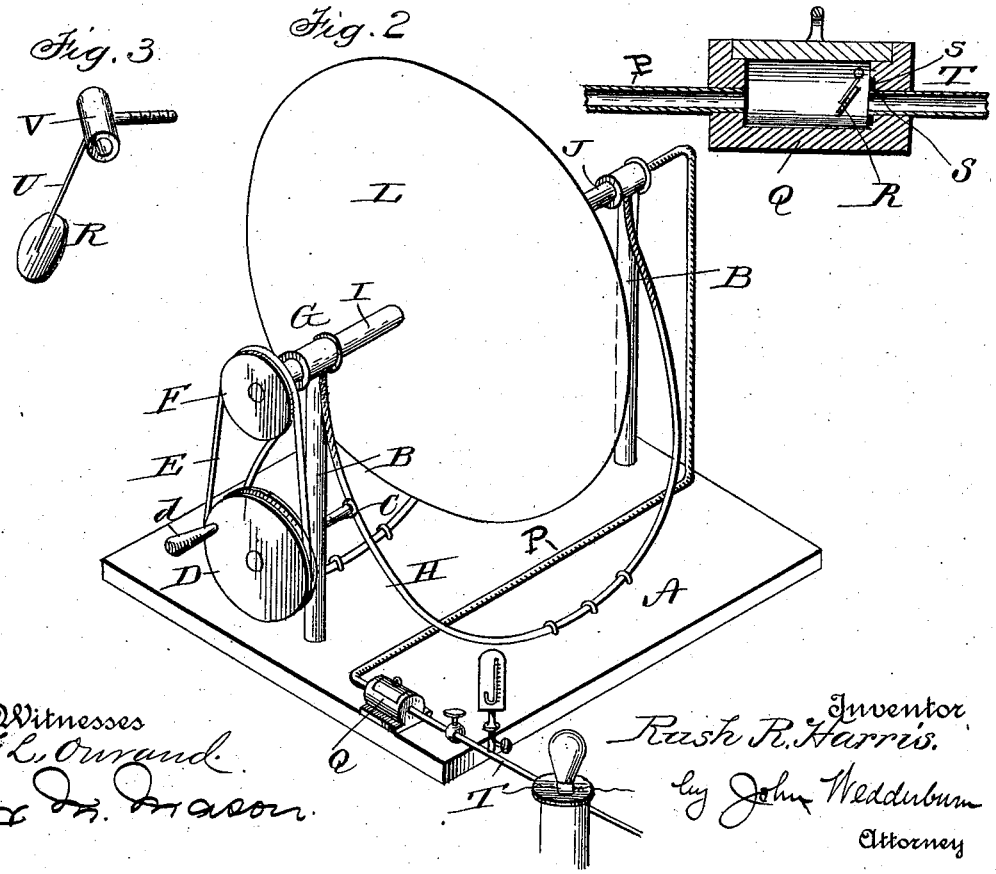

UNITED STATES PATENT OFFICE.

RUSH R. HARRIS, OF BLOOMINGVILLE, OHIO.

AIR-PUMP.

SPECIFICATION forming part of Letters Patent No. 575,946, dated January 26, 1897.

Application filed August 13, 1896. Serial No. 602,653. (No model.)

*To all whom it may concern:*

Be it known that I, RUSH R. HARRIS, a citizen of the United States, residing at Bloomingville, in the county of Erie and State of Ohio, have invented certain new and useful Improvements in Air-Pumps; and I do hereby declare the following to be a full, clear, and exact description of the invention, such as will enable others skilled in the art to which it appertains to make and use the same.

This invention relates to certain new and useful improvements in air-pumps or centrifugal air-exhausters; and it has for its object, among others, to provide a simple and cheap device for this purpose composed of few parts and those readily assembled and easily operated. The device can be run by hand, by an engine, a motor, or other power, and will exhaust the air from any desired number of globes or tubes at once and by the same rotation. The machine can be made of any desired size and of any material suited to the purpose. The globe is preferably of glass, and when it is revolved rapidly the air is forced out of it at the hole provided at the periphery thereof and a temporary vacuum thus formed in the globe. Then a valve in the connection between the globe and the tube or other device from which the air is to be exhausted is opened and the air rushes out of the same into the globe to take the place of that forced out by centrifugal action, thus forming a vacuum in the second vessel or vessels. This valve closes automatically as soon as the globe ceases to revolve, so that no air can enter the vessel from which the air has been exhausted.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is a substantially central section through my improved air-pump, the section being a vertical one in line with the shaft of the globe. Fig. 2 is a perspective view of the apparatus. Fig. 3 is an enlarged detail of the valve. Fig. 4 is a vertical section through the valve-box.

Like letters of reference indicate like parts throughout the several views.

Referring now to the details of the drawings by letter, A designates the base, which may be of any suitable material and of any required shape and size. Rising from the base is a standard B, in which is supported the shaft C, which has thereon the wheel D, the periphery of which is preferably grooved and which is provided with a crank-handle d, by which it may be revolved, or motion may be imparted thereto from a motor or other source of power in any suitable way. Around this pulley or wheel passes a belt E, which passes also around the pulley or wheel F on the shaft of the exhauster, so that revolution of the wheel D will give a rotary motion to the exhauster.

The shaft of the exhauster is mounted in suitable boxes or bearings G, supported on the upper ends of the curved arms H, which are secured to or rise from the base and which combine great strength with lightness, although other forms of support for this shaft may be employed. This shaft is composed of two parts, one of which, I, is solid, except at its inner end, which is hollow and interiorly threaded to receive the other part, J, which is hollow and exteriorly threaded to engage the threads of the part I, and the adjacent ends of these two parts are formed each with an opening K, the screws on the two parts being cut so as to bring the said openings opposite each other when the two parts are screwed up. The outer end of the hollow part J of this axle or shaft is held in the inner end of the bearing or valve-box, and each part of the shaft carries a hemisphere L, the two being so constructed that when drawn together by the screwing up of the axle they form a tight globe, which is provided with a hole M near its periphery, as shown. This valve-box may be provided with a valve N, which is designed to automatically close the inner end of the pipe O, which leads therefrom to the receiver, or this box or bearing may be without a valve and a pipe P lead therefrom to the valve-box Q, which is by preference arranged upon the base upon the same side thereof as the crank-handle and operating means, and within this valve-box is a valve R, which is adapted to close the opening S into the pipe T which leads to the receiver, this opening being surrounded by a rubber or analogous packing ring s to form an air-tight joint and against which the valve closes. This valve is preferably made of aluminium and is a swing or flap valve. It is connected by wire or other connection U with a tube V, with a screw on the side and screwed into a hole bored above the said opening. The receiver may be of any suitable form and supported in any desired manner in any required position. Suitable oilers are provided for the bearings.

With the parts constructed and arranged substantially as above described the operation will be readily understood. The parts being assembled and the vessel or vessels from which it is desired to exhaust the air being placed in position upon the receivers, which are provided with a suitable packing-ring of rubber, the globe formed of the two connected hemispheres is rapidly revolved. This forms a temporary vacuum in the globe, and the valve is opened, and the air from the vessel connected therewith rushes out to take the place of that withdrawn from the globe through the opening therein by centrifugal force, and the continued revolution of the globe forms a complete vacuum in the vessel, and as soon as the globe ceases revolving the valve closes by its own weight, and air cannot enter the vessel, as the least pressure thereagainst will only close it the tighter.

Modifications in detail may be resorted to without departing from the spirit of the invention or sacrificing any of its advantages.

I may sometimes attach a barometer to the tube near the valve-box, which will be found in many cases to be a valuable accessory to the apparatus, as by its use the required atmosphere within the bulbs or vessels can be accurately measured and retained by turning the stop-cock. This attachment would make the machine absolutely perfect as a useful and scientific apparatus.

The valve-box can be made in several different styles, but the cylinder form is preferable. The opening at the top should be sufficiently large to admit the hand to adjust and arrange the valve.

What is claimed as new is—

1. A globe for the purpose described, composed of two hemispheres each having an axle one of which is hollow and the two connected together with an opening from the hollow portion into the interior of the globe, as set forth.

2. The combination of the one portion of the globe having a solid axle with a hollow threaded end, of the other portion having a hollow axle with threaded end to engage in the threaded end of the first-mentioned part and coincident openings in the connected ends, as shown and described.

3. The combination with the globe having an opening near its periphery and an axle having an opening at its center, of a hollow bearing and a pipe connected therewith and an automatic valve controlling said pipe, as set forth.

4. The combination with the globe and the means for revolving the same, of a hollow bearing communicating with the interior of the globe, a pipe leading therefrom a receiver and a valve between the receiver and hollow bearing, as set forth.

In testimony whereof I have signed this specification in the presence of two subscribing witnesses.

RUSH R. HARRIS.

Witnesses:
ELLA M. HOUSTON,
JAMES M. FRENCH.